United States Patent
Han et al.

(10) Patent No.: US 9,897,884 B2
(45) Date of Patent: Feb. 20, 2018

(54) LIQUID CRYSTAL DISPLAY DEVICE

(71) Applicant: Samsung Display Co. Ltd., Yongin-si (KR)

(72) Inventors: Min Ju Han, Seoul (KR); Dan Bi Yang, Gunpo-si (KR); Ji Phyo Hong, Pyeongtaek-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 72 days.

(21) Appl. No.: 15/196,827

(22) Filed: Jun. 29, 2016

(65) Prior Publication Data

US 2017/0176785 A1 Jun. 22, 2017

(30) Foreign Application Priority Data

Dec. 21, 2015 (KR) ......................... 10-2015-0182988

(51) Int. Cl.
*G02F 1/1343* (2006.01)
*G02F 1/137* (2006.01)
*G02F 1/1368* (2006.01)

(52) U.S. Cl.
CPC ............ *G02F 1/137* (2013.01); *G02F 1/1368* (2013.01); *G02F 1/134309* (2013.01); *G02F 1/134363* (2013.01); *G02F 2001/134345* (2013.01); *G02F 2001/134381* (2013.01); *G02F 2201/121* (2013.01); *G02F 2201/123* (2013.01)

(58) Field of Classification Search
CPC ......... G02F 1/134309; G02F 1/134363; G02F 2001/134381; G02F 2001/134345; G02F 1/137
See application file for complete search history.

(56) References Cited

U.S. PATENT DOCUMENTS

| 9,063,383 | B2 * | 6/2015 | Chung | G02F 1/134336 |
| 2005/0024548 | A1 * | 2/2005 | Choi | G02F 1/134363 349/43 |
| 2009/0091587 | A1 * | 4/2009 | Kim | G02F 1/134363 345/690 |
| 2010/0110358 | A1 * | 5/2010 | Um | G02F 1/134363 349/141 |

(Continued)

FOREIGN PATENT DOCUMENTS

| KR | 101085431 | 11/2011 |
| KR | 1020130137404 | 12/2013 |
| KR | 101421627 | 7/2014 |

*Primary Examiner* — Michael Caley
*Assistant Examiner* — Jia Pan
(74) *Attorney, Agent, or Firm* — Cantor Colburn LLP (57) ABSTRACT

A liquid crystal display ("LCD") device includes: a first display panel including a first substrate, a first pixel electrode disposed on the first substrate, and a second pixel electrode disposed on the first substrate and insulated from the first pixel electrode; a second display panel including a second substrate opposite to the first substrate, and a common electrode disposed on the second substrate; and a liquid crystal layer disposed between the first and second display panels and including a plurality of liquid crystal molecules. In a black state, no voltage is applied to the common electrode and an electric field is generated between the first and second pixel electrodes in a way such that the liquid crystal molecules are aligned in a vertical direction with respect to the first substrate.

16 Claims, 5 Drawing Sheets

(56) References Cited

U.S. PATENT DOCUMENTS

| | | | | |
|---|---|---|---|---|
| 2012/0162560 A1* | 6/2012 | Oiwa | ............... | G02F 1/134309 349/43 |
| 2013/0162937 A1* | 6/2013 | Lu | ...................... | G02F 1/13439 349/123 |
| 2014/0036192 A1* | 2/2014 | Iyama | .............. | G02F 1/134363 349/46 |
| 2014/0111561 A1* | 4/2014 | Lyama | ................ | G09G 3/3648 345/690 |
| 2015/0092148 A1* | 4/2015 | Takano | ................ | G02F 1/1339 349/130 |
| 2015/0109274 A1* | 4/2015 | Yoshioka | ............ | G09G 3/3648 345/209 |

\* cited by examiner

LIQUID CRYSTAL DISPLAY DEVICE

This application claims priority to Korean Patent Application No. 10-2015-0182988, filed on Dec. 21, 2015, and all the benefits accruing therefrom under 35 U.S.C. 119, the content of which in its entirety is herein incorporated by reference.

BACKGROUND

1. Field

Exemplary embodiments of the invention relate to a liquid crystal display ("LCD") device.

2. Description of the Related Art

A liquid crystal display ("LCD") device is one of the most widely-used types of flat panel display. The LCD device typically includes two substrates on which field-generating electrodes such as pixel electrodes and a common electrode are provided and a liquid crystal layer which is disposed between the two substrates. The LCD device generates an electric field in the liquid crystal layer by applying a voltage to the field-generating electrodes to determine the orientation of liquid crystal molecules in the liquid crystal layer, and controls the polarization of light incident thereupon, thereby displaying an image.

SUMMARY

In a liquid crystal display ("LCD") device, the liquid crystal molecules may be controlled, e.g., pretilted, using an alignment layer, but various issues may arise therefrom such as a balance between the liquid crystal molecules and the alignment layer and the reliability and the processability of the material of the alignment layer. More specifically, smudges may be formed due to the printability and the thickness distribution of the alignment layer, which may vary depending on the conditions for a process for forming the alignment layer, and afterimages may be generated or caused by the material of the alignment layer.

Exemplary embodiments of the invention provide an LCD device in which liquid crystal molecules are aligned without using an alignment layer.

Exemplary embodiments of the invention also provide an LCD device in which smudges that may be formed due to the thickness distribution of an alignment layer or an alignment defect are effectively prevented.

According to an exemplary embodiment of the invention, a liquid crystal display (LCD) device includes: a first display panel including a first substrate, a first pixel electrode disposed on the first substrate, and a second pixel electrode disposed on the first substrate and insulated from the first pixel electrode; a second display panel including a second substrate disposed opposite to the first substrate, and a common electrode disposed on the second substrate; and a liquid crystal layer disposed between the first and second display panels and including a plurality of liquid crystal molecules. In such an embodiment, in a black state, no voltage is applied to the common electrode and an electric field is generated between the first and second pixel electrodes in a way such that the liquid crystal molecules are aligned in a vertical direction with respect to the first substrate.

According to the exemplary embodiments, an LCD device includes: a first display panel including a first pixel electrode, which includes a plurality of first branch electrodes, and a second pixel electrode, which includes a plurality of second branch electrodes; a second display panel including a common electrode disposed to overlap the first and second pixel electrodes; and a liquid crystal layer disposed between the first and second display panels and including a plurality of liquid crystal molecules. In such an embodiment, the first branch electrodes and the second branch electrodes are alternately arranged with each other, the liquid crystal molecules are aligned vertically with respect to the first display panel in a black state, two different voltages having different levels from each other are applied to the first branch electrodes and the second branch electrodes, respectively, in the black state.

BRIEF DESCRIPTION OF THE DRAWINGS

The above and other features of the disclosure will become more apparent by describing in detail exemplary embodiments thereof with reference to the attached drawings, in which.

DETAILED DESCRIPTION

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. "Or" means "and/or." As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments of the invention will be described in detail with reference to the accompanying drawings.

Figure 1:
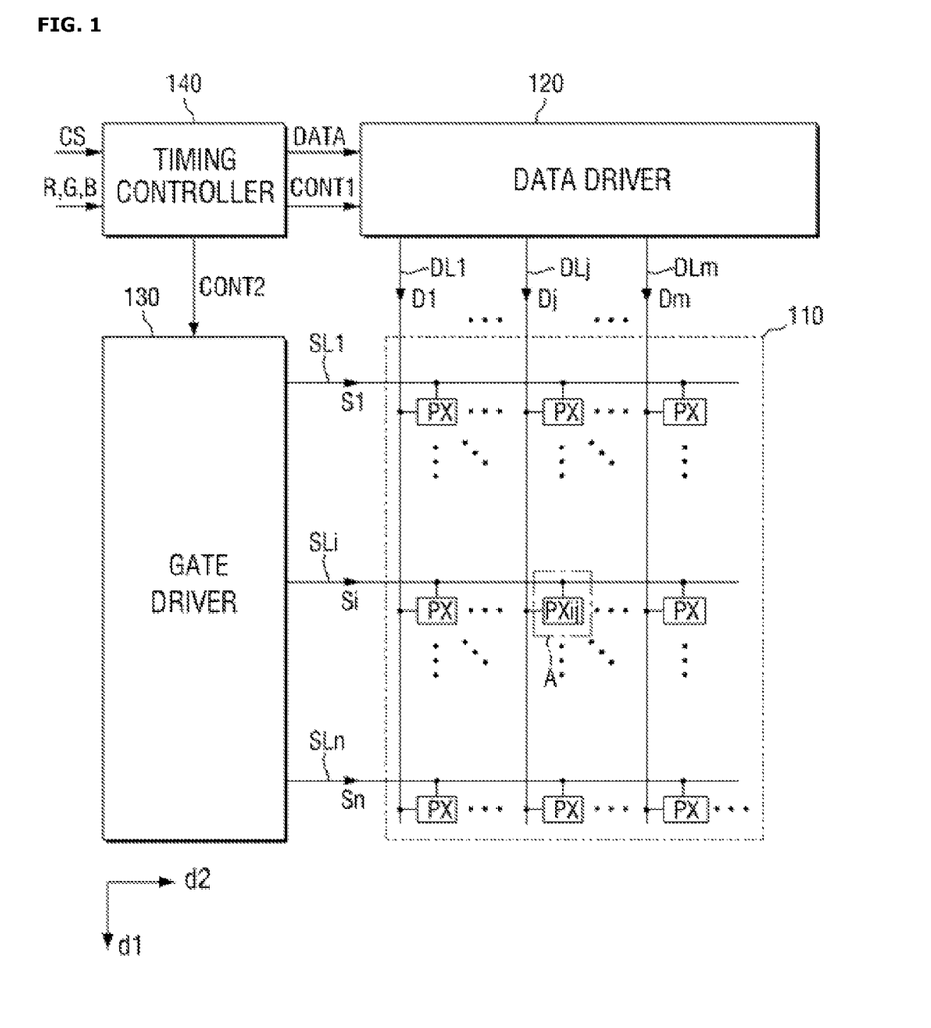
FIG. 1 is a block diagram of an exemplary embodiment of a liquid crystal display ("LCD") device according to the invention.

FIG. 1 is a block diagram illustrating an exemplary embodiment of a liquid crystal display ("LCD") device according to the invention.

Referring to FIG. 1, an exemplary embodiment of the LCD device may include a display panel 110, a data driver 120, a gate driver 130 and a timing controller 140.

The display panel 110 is a panel for displaying an image. In an exemplary embodiment, the display panel 110 may include a lower display panel (10 of FIG. 3), an upper display panel (20 of FIG. 3), which faces the lower display panel (10 of FIG. 3), and a liquid crystal layer (30 of FIG. 3), which includes a plurality of liquid crystal molecules interposed between the lower display panel (10 of FIG. 3) and the upper display panel (20 of FIG. 3). In such an embodiment, the display panel 110 may be a liquid crystal panel.

The display panel 110 is connected to a plurality of gate lines SL1 through SLn and a plurality of data lines DL1 through DLm. The display panel 110 includes a plurality of pixel units PX, which are connected to the gate lines SL1 through SLn and the data lines DL1 through DLm. The gate lines SL1 through SLn, the data lines DL1 through DLm and the pixel units PX may be disposed in the lower display panel (10 of FIG. 3), and the gate lines SL1 through SLn and the data lines DL1 through DLm are arranged to be insulated from each other.

The pixel units PX may be arranged substantially in a matrix form. The data lines DL1 through DLm may extend along a first direction $d_1$, and the gate lines SL1 through SLn may extend along a second direction $d_2$, which intersects the first direction $d_1$. Referring to FIG. 1, the first direction $d_1$ is a column direction, and the second direction $d_2$ is a row direction. Each of the pixel units PX is provided with a data signal by a corresponding one of the data lines DL1 through DLm in response to a gate signal provided thereto via a corresponding one of the gate lines SL1 through SLn.

The data driver 120 may include, for example, a shift register, a latch and a digital-to-analog converter ("DAC"). The data driver 120 may be provided with a first control signal CONT1 and image data DATA by the timing controller 140. The data driver 120 may select a reference voltage based on the first control signal CONT1, and may convert the image data DATA, which has a digital waveform, into a plurality of data signals D1 through Dm based on the selected reference voltage. The data driver 120 may provide the data signals D1 through Dm to the display panel 110.

The gate driver 130 may be provided with a second control signal CONT2 by the timing controller 140. The gate driver 130 may provide a plurality of gate signals S1 through Sn according to the second control signal CONT2.

The timing controller 140 may receive an image signal R, G, B and a control signal CS for controlling the image signal R, G, B from an external source. The control signal CS may include, for example, a vertical synchronization signal, a horizontal synchronization signal, a main clock signal, and a data enable signal. The timing controller 140 may process the signals received from the external source to be suitable for an operating condition of the display panel 110, and may generate the image data DATA, the first control signal CONT1 and a second control signal CONT2 based thereon. The first control signal CONT1 may include a horizontal synchronization start signal indicating the start of the input of the image data DATA, and a load signal for controlling the application of the data signals D1 through Dm to the data lines DL1 through DLm. The second control signal CONT2 may include a scan initiation start signal for instructing the start of the output of the scan signals S1 through Sn and a gate clock signal for controlling when to output a scan-on pulse.

In an exemplary embodiment, the LCD device may further include a power supply (not illustrated). The power supply may provide an operating power for the LCD device, and may provide a common voltage Vcom to the display panel 110 via a common line (not illustrated). The common line may be for applying the common voltage (Vcom of FIG. 2), which is provided by the power supply, to a common electrode (not illustrated) of the display panel 110. The common line may be arranged on a side of the display panel 110 and may extend along a predetermined direction. The common line may be disposed in the upper display panel (20 of FIG. 3), but the invention is not limited thereto.

Figure 2:
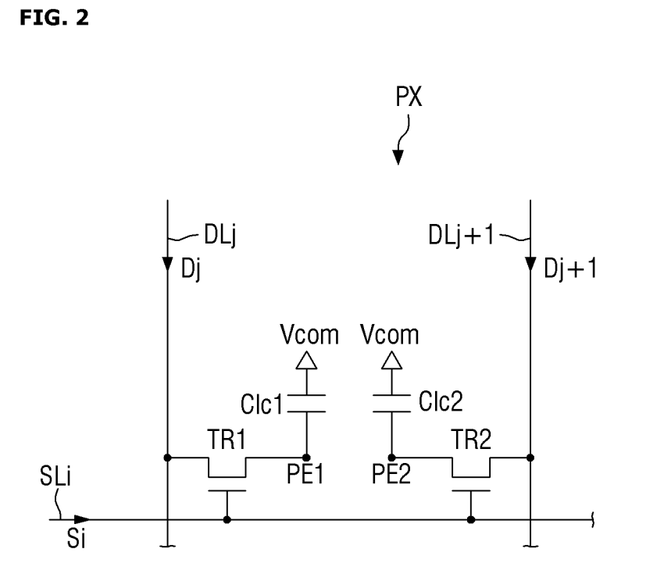
FIG. 2 is an equivalent circuit diagram of a pixel unit of the LCD device of FIG. 1.

FIG. 2 is an equivalent circuit diagram of a pixel unit PX of the LCD device of FIG. 1.

Referring to FIG. 2, in an exemplary embodiment, a pixel unit PX may include a first switching device TR1, a second switching device TR2, a first pixel electrode PE1, and a second pixel electrode PE2.

The first switching device TR1 may have a gate electrode connected to an i-th gate line SLi, a first electrode connected to a j-th data line DLj, and a second electrode connected to the first pixel electrode PE1. The first electrode of the first switching device TR1 may be, for example, a source electrode of the first switching device TR1, and the second electrode of the first switching device TR1 may be, for example, a drain electrode of the first switching device TR1. The first pixel electrode PE1 may define a first liquid crystal capacitor Clc1 along with a common electrode Vcom.

The second switching device TR2 may have a gate electrode connected to the i-th gate line SLi, a first electrode connected to a (j+1)-th data line DLj+1, and a second electrode connected to the second pixel electrode PE2. The first electrode of the second switching device TR2 may be, for example, a source electrode of the second switching device TR2, and the second electrode of the second switching device TR2 may be, for example, a drain electrode of the second switching device TR2. The second pixel electrode PE2 may form a second liquid crystal capacitor Clc2 along with the common electrode Vcom.

The first switching device TR1 may be turned on in response to an i-th gate signal Si provided thereto through the i-th gate line SLi and may provide a j-th data signal Dj, which is provided thereto through the j-th data line DLj, to the first pixel electrode PE1. Accordingly, the first liquid crystal capacitor Clc1 may be charged with a potential difference between a voltage applied to the first pixel electrode PE1 and a common voltage applied to the common electrode Vcom. The second switching device TR2 may be turned on in response to the i-th gate signal Si provided thereto through the i-th gate line SLi and may provide a (j+1)-th data signal Dj+1, which is provided thereto through the (j+1)-th data line DLj+1, to the second pixel electrode PE2. Accordingly, the second liquid crystal capacitor Clc2 may be charged with a potential difference between a voltage applied to the second pixel electrode PE2 and the common voltage applied to the common electrode Vcom.

Figure 3:
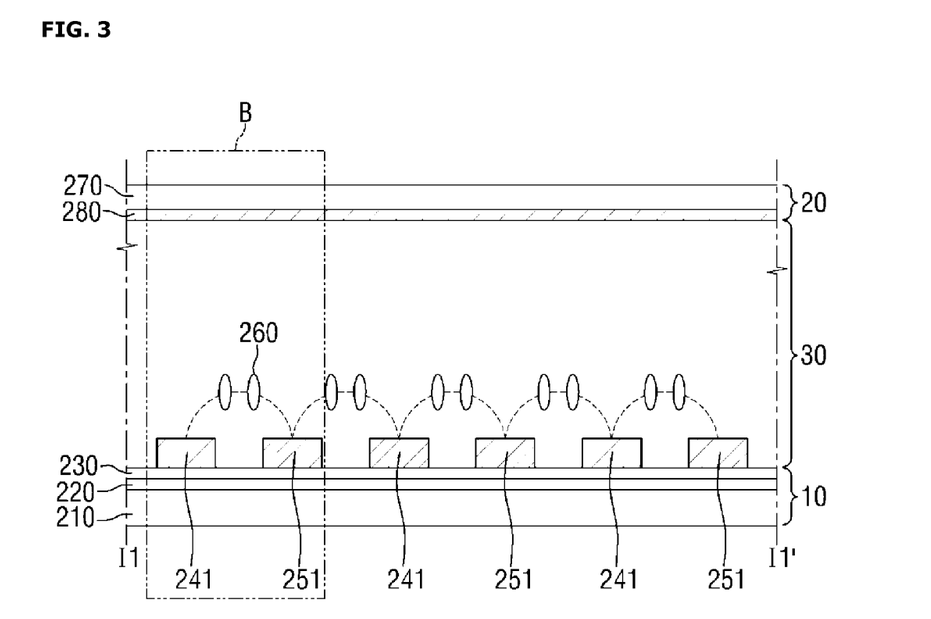
FIG. 3 is a schematic cross-sectional view of a portion of a pixel unit in an area A of FIG. 1.

FIG. 3 is a schematic cross-sectional view of a portion of a pixel unit PX in an area A of FIG. 1. The first and second pixel electrodes PE1 and PE2 of FIG. 2 correspond to first and second pixel electrodes 241 and 251 of FIG. 3, respectively.

Referring to FIGS. 2 and 3, an exemplary embodiment of the LCD device may include a lower display panel 10, an upper display panel 20, and a liquid crystal layer 30 disposed between the lower and upper display panels 10 and 20. The upper display panel 20 may be disposed opposite to, e.g., to face, the lower display panel 10. The lower display panel 10 may be bonded to the upper display panel 20 through, for example, a sealing.

The lower display panel 10 may include a lower substrate 210, a gate insulating layer 220, which is disposed on the lower substrate 210, a second passivation layer 230, which is disposed on the gate insulating layer 220, and the first and second pixel electrodes 241 and 251, which are disposed on the second passivation layer 230.

The lower substrate 210 may be, for example, a glass substrate, a plastic substrate or a low-temperature polycrystalline silicon ("LTPS") substrate, and may be an array substrate on which a plurality of switching devices are arranged.

The gate insulating layer 220 may be disposed on the lower substrate 210. In an exemplary embodiment, the gate insulating layer 220 may be disposed on a gate electrode and a gate line, which are disposed between the lower substrate 210 and the gate insulating layer 220. The gate insulating layer 220 may include or be formed of, for example, silicon nitride (SiNx) or silicon oxide (SiOx). The gate insulating layer 220 may have a multilayer structure including at least two insulating layers having different physical properties from each other.

The second passivation layer 230 may be disposed on the gate insulating layer 220. In an exemplary embodiment, the second passivation layer 230 may be disposed on a color filter (not illustrated). The second passivation layer 230 may include or be formed of an inorganic insulating material, such as silicon nitride or silicon oxide, or an organic insulating material. The second passivation layer 230 may effectively prevent the color filter from being lifted off from the underlying layers and may effectively prevent the liquid crystal layer 30 from being contaminated by an organic material such as a solvent from the color filter, thereby effectively preventing defects such as image sticking that may occur during the driving of the LCD device.

The first pixel electrode 241 may be disposed on the second passivation layer 230 to be insulated from the second pixel electrode 251. Each of the first and second pixel electrodes 241 and 251 may include or be formed of, for example, a transparent conductive material such as indium tin oxide ("ITO") or indium zinc oxide ("IZO"). The first and second pixel electrodes 241 and 251 may be respectively provided with two voltages having different levels, and thus, an electric field may be generated between the first and second pixel electrodes 241 and 251. The first and second pixel electrodes 241 and 251 may be disposed in or on a same layer, as illustrated in FIG. 3, but the invention is not limited thereto. In an alternative exemplary embodiment, the first and second pixel electrodes 241 and 251 may be disposed in different layers, respectively.

The first pixel electrode 241 may include a first stem electrode, which is rectangular, and a plurality of first branch electrodes, which extend from the first stem electrode and form a predetermined inclination angle with the first stem electrode. The second pixel electrode 251 may include a second stem electrode, which is cross-shaped, and a plurality of second branch electrodes, which extend from the second stem electrode and form a predetermined inclination angle with the second stem electrode. In FIG. 3, the first branch electrodes and the second branch electrodes, which are alternately disposed with each other, are shown.

In each sub-region defined by the first and second stem electrodes, the first branch electrodes may be disposed to be in parallel to one another, and the second branch electrodes may be disposed to be in parallel to one another. The first branch electrodes may be spaced from one another by a predetermined distance, and the second branch electrodes may be spaced from one another by a predetermined distance. The distance between the first branch electrodes may differ from the distance between the second branch electrodes.

The first pixel electrode 241 may be provided with a first pixel voltage through a switching operation of a first switching device TFT1, and the second pixel electrode 251 may be provided with a second pixel voltage through a switching operation of a second switching device TFT2. The connection between, and the arrangement of, the first pixel electrode 241 and the first switching device TFT1 and the connection between, and the arrangement of, the second pixel electrode 251 and the second switching device TFT2 are not particularly limited. In such an embodiment, the first and second pixel electrodes 241 and 251 may have at least one of various structures as long as the first and second pixel electrodes 241 and 251 are insulated from each other and are thus respectively provided with two voltages of different levels.

The upper display panel 20 may include an upper substrate 270 and a common electrode 280, which is disposed on the upper substrate 270.

The upper substrate 300 may include or be formed of transparent glass or plastic.

A light-shielding member or an overcoat layer, which is also referred to as a black matrix and prevents light leakage, may be disposed on the upper substrate 270. The liquid crystal layer 30 may be interposed between the lower display panel 10 and the upper display panel 20. The liquid crystal layer 30 may include a plurality of liquid crystal molecules 260. In response to an electric field generated in the LCD device, the liquid crystal molecules 260 may be aligned vertically with respect to the electric field.

In an exemplary embodiment of the LCD device, no alignment layer is provided on the first and second pixel electrodes 241 and 251. In such an embodiment, no alignment layer is provided on the common electrode 280. An exemplary embodiment of a driving method of the LCD will hereinafter be described with reference to FIGS. 4 and 5.

Figure 4:
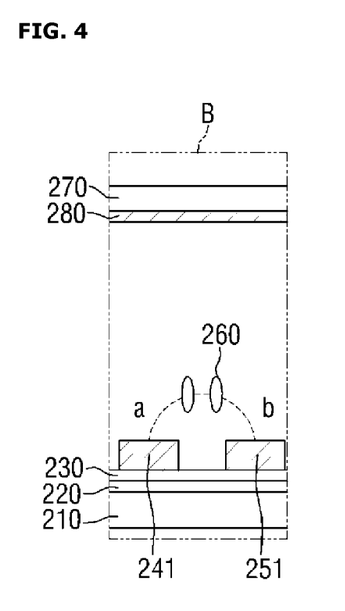
FIGS. 4 and 5 are schematic cross-sectional views showing an exemplary embodiment of a driving method of the LCD device of FIG. 1.

FIG. 4 is a schematic cross-sectional view of an area B of FIG. 3 showing the alignment of the liquid crystal molecules 260 in a black state.

Referring to FIG. 4, when the LCD, e.g., a pixel unit thereof, is in the black state, no voltage may be applied to the common electrode 280, and an electric field is generated between the first and second pixel electrodes 241 and 251, e.g., first and second pixel voltages a and b may be applied to the first and second pixel electrodes 241 and 251, respectively. The first and second pixel voltages a and b may have different levels from each other. Since no voltage is applied to the common electrode 280, no electric field is generated between the common electrode 280 and the first and second pixel electrodes 241 and 251. In such an embodiment, when the first and second pixel voltages a and b, which have different levels, are applied to the first and second pixel electrodes 241 and 251, respectively, a horizontal field may be generated between the first and second pixel electrodes 241 and 251 depending on a potential difference between the first and second pixel voltages a and b.

In one exemplary embodiment, for example, the first pixel voltage a may be about 7 volts (V), and the second pixel voltage b may be about zero (0) V. In such an embodiment, a horizontal field is generated because of a potential difference between the first and second pixel voltages a and b, and the liquid crystal molecules 260, which have negative dielectric anisotropy, may be aligned in a vertical direction with respect to the horizontal field, i.e., in a substantially vertical direction with respect to the lower substrate 210.

Accordingly, light passing through a lower polarizing plate (not illustrated), which is disposed on an outer surface of the lower display panel 10, and the lower display panel 10 may pass through the upper display panel 20 as it is without changing a polarization state thereof by the liquid crystal molecules 260, which are vertically aligned. The light passing through the upper display panel 20 may not pass through an upper polarizing plate (not illustrated), which is disposed on an outer surface of the upper display panel 20, and thus, such an embodiment of the LCD device may be in the black state, which is a state in which each pixel unit does not transmit light therethrough.

Figure 5:
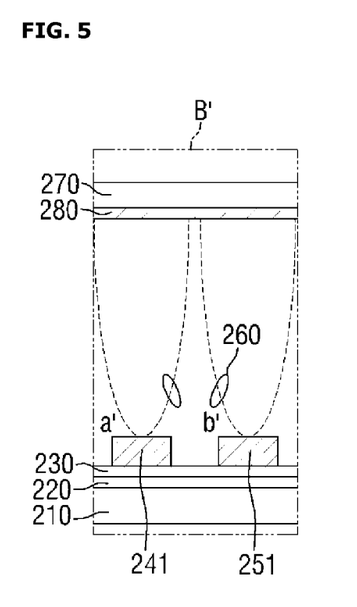

FIG. 5 is a schematic cross-sectional view of the area B of FIG. 3 showing the alignment of the liquid crystal molecules 260 during a transition from the black state to a full white state in which the LCD device has maximum optical transmissivity. To clarify the changed state, the area B of FIG. 3 is labeled as an area B' in FIG. 4.

Referring to FIG. 5, during a transition from the black state to the full white state, first and second pixel voltages a' and b', which have the same level as each other, may be applied to the first and second pixel electrodes 241 and 251, respectively, to eliminate a voltage difference between the first and second pixel electrodes 241 and 251 and thus to eliminate a horizontal field, and at the same time, a common voltage may be applied to the common electrode 280 to generate a vertical field between the common electrode 280 and the first and second pixel electrodes 241 and 251.

In one exemplary embodiment, for example, a common voltage in a range of about 6 V to about 7 V may be applied to the common electrode 280, and a voltage of about 12 V may be applied to both of the first and second pixel electrodes 241 and 251. Accordingly, no horizontal field is generated between the first and second pixel electrodes 241 and 251 due to the lack of a voltage difference between the first and second pixel electrodes 241 and 251, but a vertical field is generated between the common electrode 280 and the first and second pixel electrodes 241 and 251 due to the voltage difference between the common electrode 280 and the first and second pixel electrodes 241 and 251. As a result, in the full white mode, the liquid crystal molecules 260 may be aligned in a vertical direction with respect to the vertical field to be in parallel to the lower substrate 210.

In such an embodiment, in the black state, no voltage is applied to the common electrode 280, and two voltages of different levels are respectively applied to the first and second pixel electrodes 241 and 251, thereby aligning the liquid crystal molecules 260 vertically with respect to the lower substrate 210. In such an embodiment, in a white state, a predetermined voltage is applied to the common electrode 280, and two voltages of the same level, which is different from the level of the voltage applied to the common electrode 280, are respectively applied to the first and second pixel electrodes 241 and 251, thereby aligning the liquid crystal molecules 260 to be in parallel to the lower substrate 210.

In such an embodiment, the LCD device aligns the liquid crystal molecules 251, as discussed above with reference to FIGS. 4 and 5, and may thus be effectively operated without using any alignment layer. Accordingly, an exemplary embodiment of the LCD device may effectively prevent smudges that may be formed due to the printability and the thickness distribution of an alignment layer, which may vary depending on the conditions for a process for forming the alignment layer, and afterimages, foreign material defects, or Yogore defects that may occur due to the material of an alignment layer.

The structure of the first and second pixel electrodes 241 and 251 and the connection between the first and second pixel electrodes 241 and 251 and switching devices may be implemented in various manners as long as in the black state, two voltages of different levels are respectively applied to the first and second pixel electrodes 241 and 251 and in a non-black state, two voltages of the same level are respectively applied to the first and second pixel electrodes 241 and 251.

In one exemplary embodiment, for example, referring back to FIG. 2, in the black state, no voltage may be applied to the common electrode Vcom, and the first data signal Dj, which is applied to the first pixel electrode PE1, and the (j+1)-th data signal Dj+1, which is applied to the second pixel electrode PE, may have a different voltage level from each other. Accordingly, since no voltage is applied to the common voltage Vcom, no electric field is generated between the common electrode Vcom and the first and second pixel electrodes PE1 and PE2. In such an embodiment, when two voltages of different levels are respectively applied to the first and second pixel electrodes PE1 and PE2, a horizontal field is generated between the first and second pixel electrodes PE1 and PE2 due to a potential difference between the two voltages. As a result, the liquid crystal molecules 260, which have negative dielectric anisotropy, may be aligned in a vertical direction with respect to the horizontal field, i.e., in a substantially vertical direction with respect to the lower substrate 210. Thus, such an embodiment of the LCD may be effectively in the black state, which is a state in which each pixel unit does not transmit light therethrough.

In such an embodiment, during a transition from the black state to the full white state in which the LCD device has maximum optical transmissivity, j-th and (j+1)-th data signals Dj and Dj+1, which have the same level, may be applied to the first and second pixel electrodes PE1 and PE2, respectively, to eliminate a voltage difference between the first and second pixel electrodes PE1 and PE2 and thus to eliminate a horizontal field, and at the same time, a common voltage having a voltage level different from the voltage level of the first and second pixel electrodes PE1 and PE2 may be applied to the common electrode Vcom to form a substantially vertical field between the common electrode Vcom and the first and second pixel electrodes PE1 and PE2.

Accordingly, the liquid crystal molecules 260 may be aligned in a vertical direction with respect to the vertical field, and may be aligned to be in parallel to the lower substrate 210 in the full white state, in which the LCD device has maximum optical transmissivity.

According to an exemplary embodiment of the LCD device may effectively align the liquid crystal molecules 251 using the driving method described above, and may thus be effectively operated without implementing an alignment layer. Accordingly, such an embodiment of the LCD device may effectively prevent smudges that may be formed due to the printability and the thickness distribution of an alignment layer, which may vary depending on the conditions for a process for forming the alignment layer, and afterimages, foreign material defects, or Yogore defects that may occur due to the material of an alignment layer.

Although some exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display device, comprising:
   a first display panel comprising:
   a first substrate;
   a first pixel electrode disposed on the first substrate; and
   a second pixel electrode disposed on the first substrate and insulated from the first pixel electrode;
   a second display panel comprising:
   a second substrate disposed opposite to the first substrate; and
   a common electrode disposed on the second substrate; and
   a liquid crystal layer disposed between the first and second display panels and comprising a plurality of liquid crystal molecules,
   wherein in a black state, no voltage is applied to the common electrode and an electric field is generated between the first and second pixel electrodes in a way such that the liquid crystal molecules are aligned in a vertical direction with respect to the first substrate.

2. The liquid crystal display device of claim 1, wherein no alignment layer is disposed on the first pixel electrode, the second pixel electrode and the common electrode.

3. The liquid crystal display device of claim 1, wherein the first and second pixel electrodes are alternately arranged with each other.

4. The liquid crystal display device of claim 1, wherein
   the first pixel electrode comprises a plurality of first branch electrodes,
   the second pixel electrode comprises a plurality of second branch electrodes, and
   the first branch electrodes and the second branch electrodes are alternately arranged with each other.

5. The liquid crystal display device of claim 1, wherein in the black state, two different voltages having different levels from each other are applied to the first and second pixel electrodes, respectively.

6. The liquid crystal display device of claim 1, wherein the first display panel further comprises:
   a first switching device comprising:
   a first electrode connected to the first pixel electrode; and
   a gate electrode connected to an i-th gate line; and
   a second switching device comprising:
   a first electrode connected to the second pixel electrode; and
   a gate electrode connected to the i-th gate line.

7. The liquid crystal display device of claim 6, wherein
   the first switching device is connected to a j-th data line, and
   the second switching device is connected to a (j+1)-th data line.

8. The liquid crystal display device of claim 7, wherein in the black state, a voltage applied to the first pixel electrode via the j-th data line and a voltage applied to the second pixel electrode via the (j+1)-th data line have different levels from each other.

9. The liquid crystal display device of claim 1, wherein in a white state, a common voltage is applied to the common electrode and two voltages having a same level as each other are applied to the first and second pixel electrodes, respectively.

10. A liquid crystal display device, comprising:
a first display panel comprising:
   a first pixel electrode comprising a plurality of first branch electrodes; and
   a second pixel electrode comprising a plurality of second branch electrodes;
a second display panel comprising a common electrode disposed to overlap the first and second pixel electrodes; and
a liquid crystal layer disposed between the first and second display panels and comprising a plurality of liquid crystal molecules,
wherein the first branch electrodes and the second branch electrodes are alternately arranged with each other,
the liquid crystal molecules are aligned vertically with respect to the first display panel in a black state, and
two voltages having different levels are applied to the first branch electrodes and the second branch electrodes, respectively, in the black state.

11. The liquid crystal display device of claim 10, wherein in the black state, no voltage is applied to the common electrode.

12. The liquid crystal display device of claim 10, wherein no alignment layer is disposed on the first pixel electrode, the second pixel electrode and the common electrode.

13. The liquid crystal display device of claim 10, wherein the first display panel further comprises:
a first switching device comprising:
   a first electrode connected to the first pixel electrode; and
   a gate electrode connected to an i-th gate line; and
a second switching device comprising:
   a first electrode connected to the second pixel electrode; and
   a gate electrode connected to the i-th gate line.

14. The liquid crystal display device of claim 13, wherein the first switching device is connected to a j-th data line, and
the second switching device is connected to a (j+1)-th data line.

15. The liquid crystal display device of claim 14, wherein in the black state, the first pixel electrode receives a j-th data signal from the j-th data line through a switching operation of the first switching device and the second pixel electrode receives a (j+1)-th data signal from the (j+1)-th data line through a switching operation of the second switching device, and
the j-th data signal and the (j+1)-th data signal have different levels from each other.

16. The liquid crystal display device of claim 14, wherein in a white state, a common voltage is applied to the common electrode and two voltages of a same level are applied to the first and second pixel electrodes, respectively.

\* \* \* \* \*